(12) United States Patent
Leong

(10) Patent No.: US 8,208,494 B2
(45) Date of Patent: Jun. 26, 2012

(54) INTELLIGENT PACKET SLICING

(75) Inventor: Patrick Pak Tak Leong, Palo Alto, CA (US)

(73) Assignee: Gigamon LLC, Milpitas, CA (US)

( * ) Notice: Subject to any disclaimer, the term of this patent is extended or adjusted under 35 U.S.C. 154(b) by 126 days.

(21) Appl. No.: 12/327,756

(22) Filed: Dec. 3, 2008

(65) Prior Publication Data

US 2010/0135323 A1 Jun. 3, 2010

(51) Int. Cl.
*H04J 3/24* (2006.01)
(52) U.S. Cl. ........................................................ 370/474
(58) Field of Classification Search .................. 370/466, 370/467, 469, 470, 471, 472, 473, 474
See application file for complete search history.

(56) References Cited

U.S. PATENT DOCUMENTS

| | | | |
|---|---|---|---|
| 7,007,208 B1* | 2/2006 | Hibbert et al. ................. | 714/712 |
| 7,310,339 B1* | 12/2007 | Powers et al. ................. | 370/394 |
| 7,379,453 B1* | 5/2008 | DiMambro .................... | 370/363 |
| 7,424,018 B2 | 9/2008 | Gallatin et al. | |
| 7,436,832 B2 | 10/2008 | Gallatin et al. | |
| 7,440,467 B2 | 10/2008 | Gallatin et al. | |
| 7,492,763 B1* | 2/2009 | Alexander, Jr. ................ | 370/389 |
| 2003/0007489 A1* | 1/2003 | Krishnan et al. ............... | 370/392 |
| 2003/0043848 A1* | 3/2003 | Sonksen ........................ | 370/474 |
| 2003/0185239 A1* | 10/2003 | Miller et al. ................... | 370/474 |
| 2004/0042490 A1* | 3/2004 | Henderson et al. ............ | 370/469 |
| 2005/0254490 A1 | 11/2005 | Gallatin et al. | |
| 2007/0116043 A1* | 5/2007 | MeLampy et al. ............. | 370/466 |

OTHER PUBLICATIONS

U.S. Appl. No. 11/796,001, filed Apr. 25, 2007, for Leong et al.

* cited by examiner

*Primary Examiner* — Kwang B Yao
*Assistant Examiner* — Juvena Loo
(74) *Attorney, Agent, or Firm* — Vista IP Law Group, LLP

(57) ABSTRACT

Packets can be intelligently sliced by removing irrelevant portions of a packet, while retaining relevant portions. For a series of network packets, a packet is obtained from the network. The packet includes at least a header, one or more packet fields, and a first data payload. The protocol of the packet is determined. Once the protocol is known, the packet header is parsed to determine the position of the first data payload. Based on the determine positions of the first data payload, a modified packet is created by removing or masking the first data payload.

20 Claims, 7 Drawing Sheets

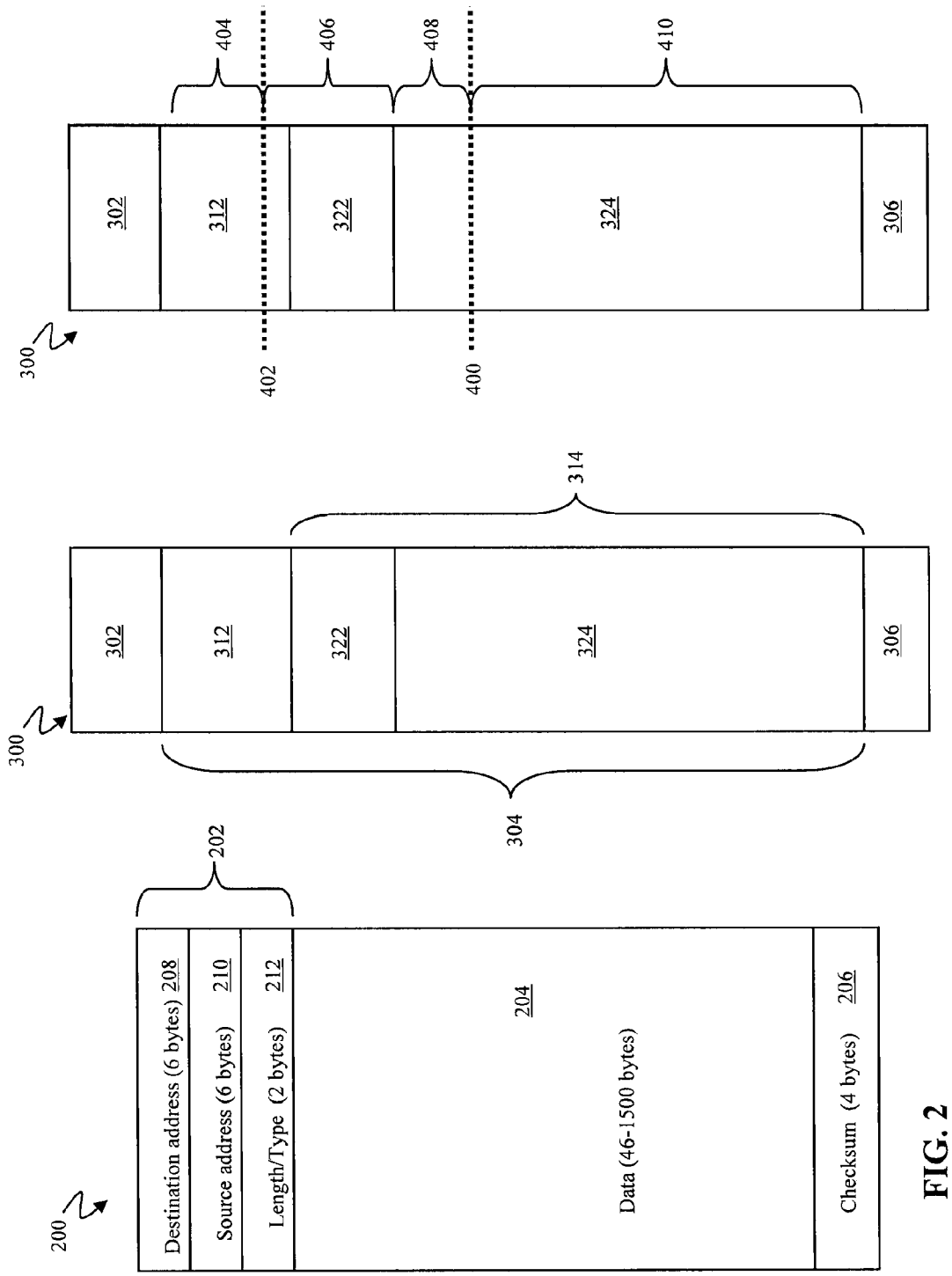

Figure 1:
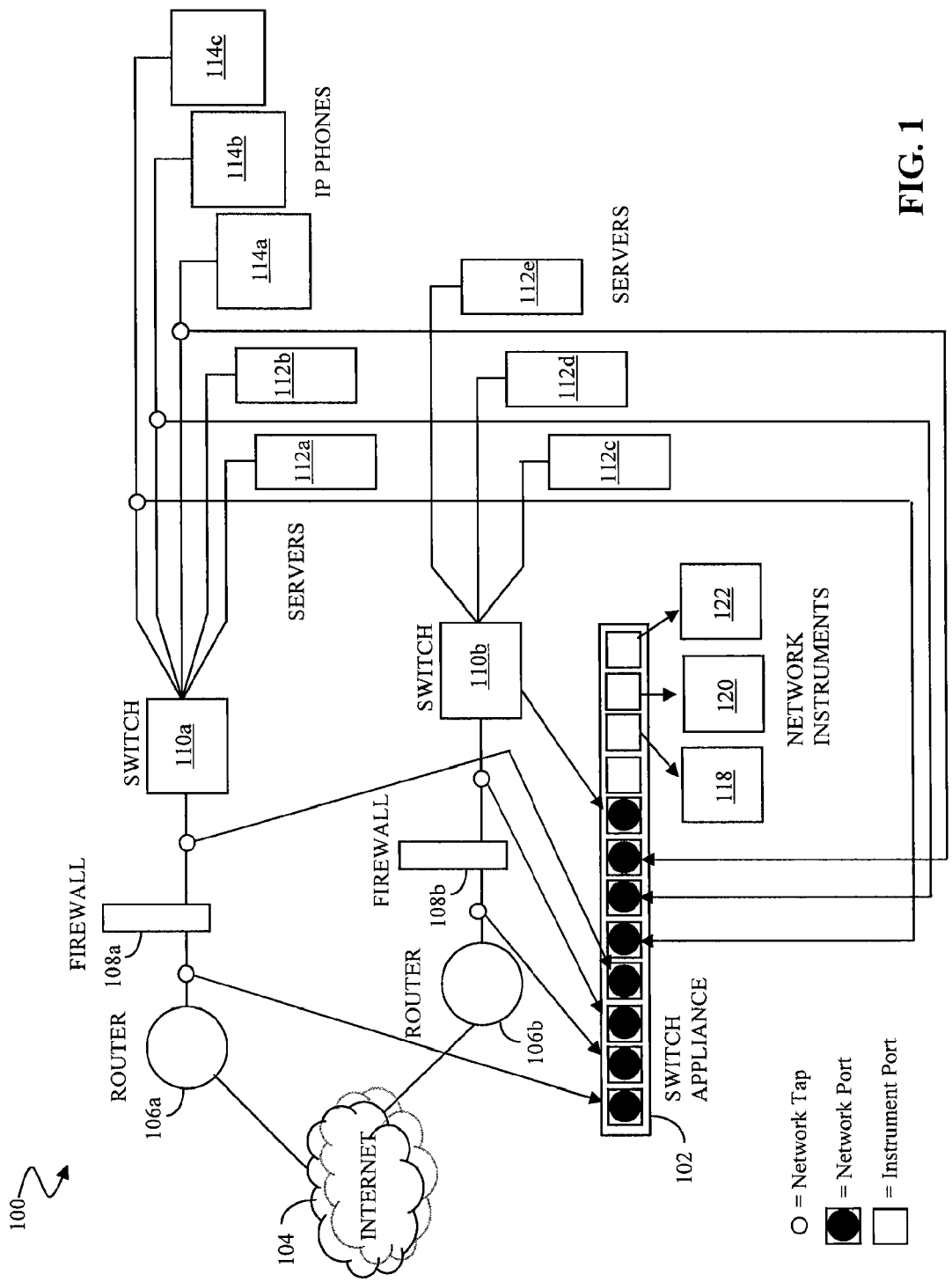

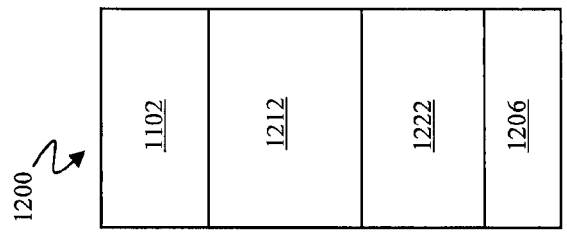
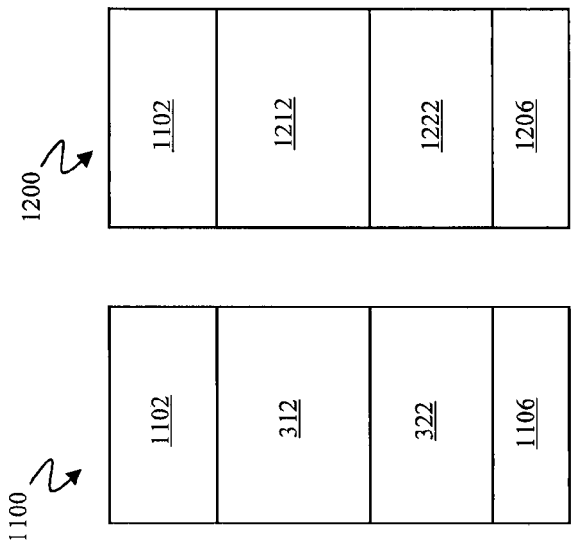
FIG. 8
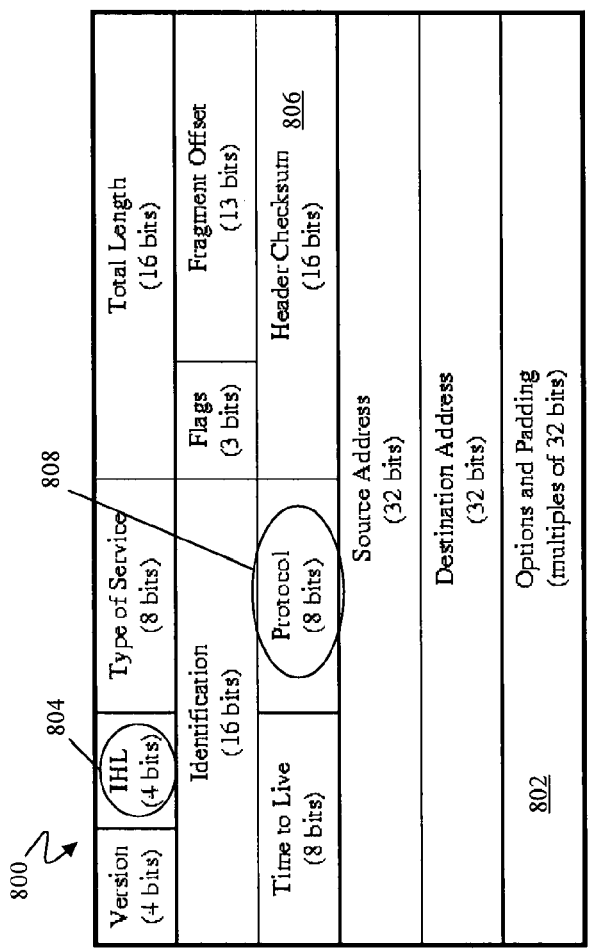
FIG. 9
FIG. 10
FIG. 11
FIG. 12

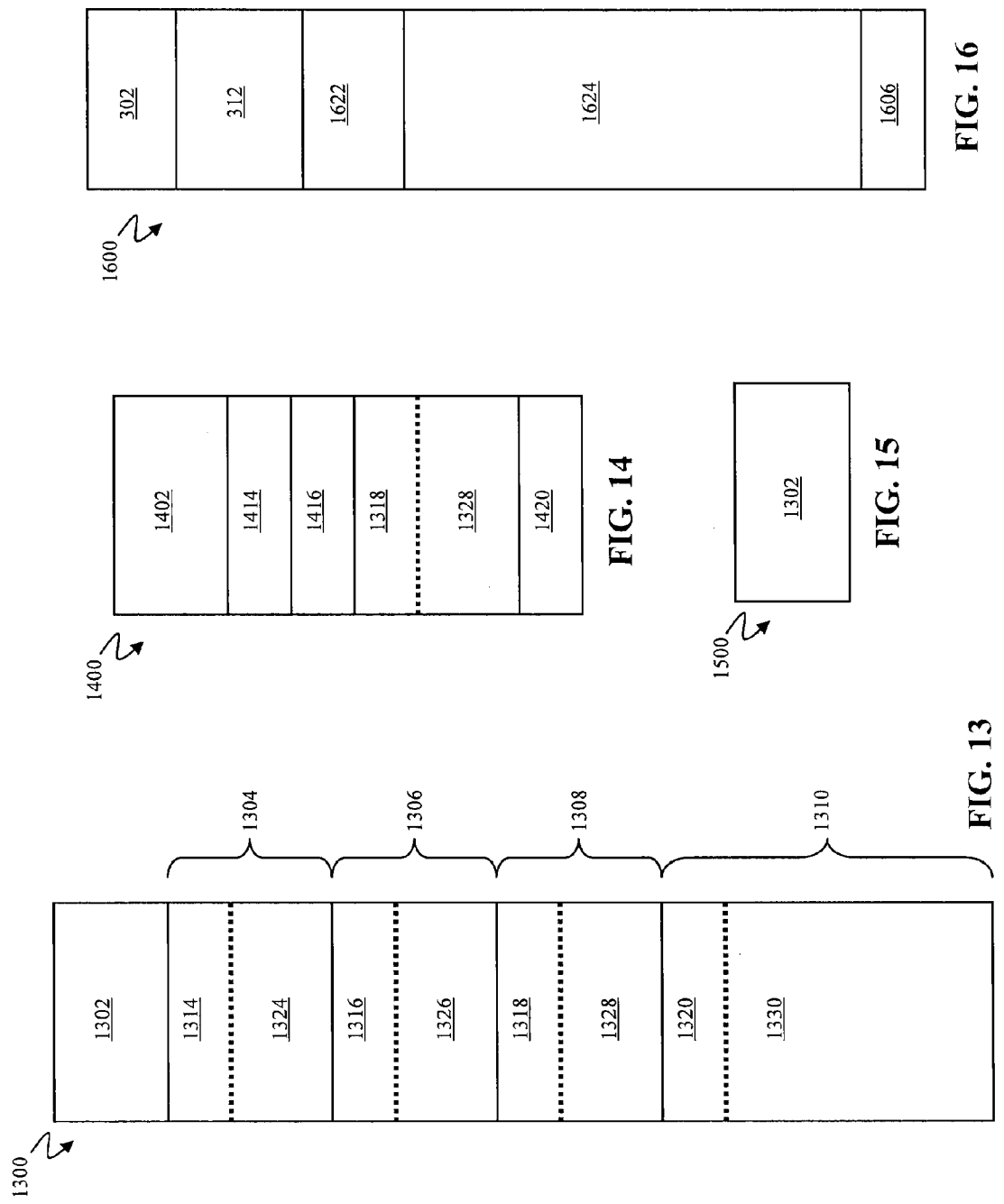

INTELLIGENT PACKET SLICING

BACKGROUND

1. Field

This application generally relates to packet networks and more specifically to intelligently slicing packets obtained from packet networks.

2. Related Art

In a typical data network, data is transmitted as packets. A packet generally has a header and a data payload.

Typically, the contents of the packet header may include several fields containing information about the contents, size, source, destination, checksum, and type of packet. Occasionally, the end of a packet also contains a field. For example, the 802.3 Ethernet standard specifies that a packet checksum is located in the final four bytes of an Ethernet packet. The format, size, and content of a packet header depend largely on the protocol of the packet. The packet data payload contains the data message that is being transmitted. Alternatively, a second packet can be layered within the data payload of a first packet.

When network problems occur, such as dropped packets, excessive lag, or low throughput, information contained in packet headers can be used to aid the diagnosis of the problem. Often, a large number of packets are needed to diagnose a problem fully. Therefore, storage of packets is often useful to enable later analysis and inspection. Additionally, a network professional is typically required to analyze the packets. The network specialist will often be off site from the network. Again, this requires that the packets be stored and transmitted to the network professional for inspection and analysis.

Networks often span a very large physical area. When a problem occurs, localizing the problem to a specific area may be difficult. Therefore, transmitting packets from locations all over the network to a central location for storage and analysis is often desirable.

While a single packet is typically small, storing a very large number of packets can quickly burden a storage device. Additionally, retransmission of packets from locations all over the network to the storage location can significantly affect bandwidth of the network. The most relevant portions of a packet for problem diagnosis, the headers, are generally a small fraction of the overall packet size. Therefore, to conserve bandwidth and reduce storage requirements, packet slicing devices can remove irrelevant portions of the packet prior to retransmission and storage.

However, conventional packet slicing techniques are based on slicing at a fixed offset regardless of the protocol, size, or contents of a packet. Therefore, often relevant portions are lost or irrelevant portions are retained.

SUMMARY

In an embodiment, a packet is obtained from a series of packets. The packet contains at least a packet header, one or more packet fields, and a first data payload. The series of packets uses one or more protocols. After obtaining the packet, one or more protocols of the obtained packet are determined. After determining the one or more protocols of the packet, the packet header is parsed to determine the position of the first data payload. Next, a modified packet is created by removing or masking the first data payload based on the determined location of the first data payload. This procedure of determining the protocol(s), parsing the header, and creating a modified packet is repeated for each packet in the series of packets.

DESCRIPTION OF DRAWING FIGURES

Figure 7:
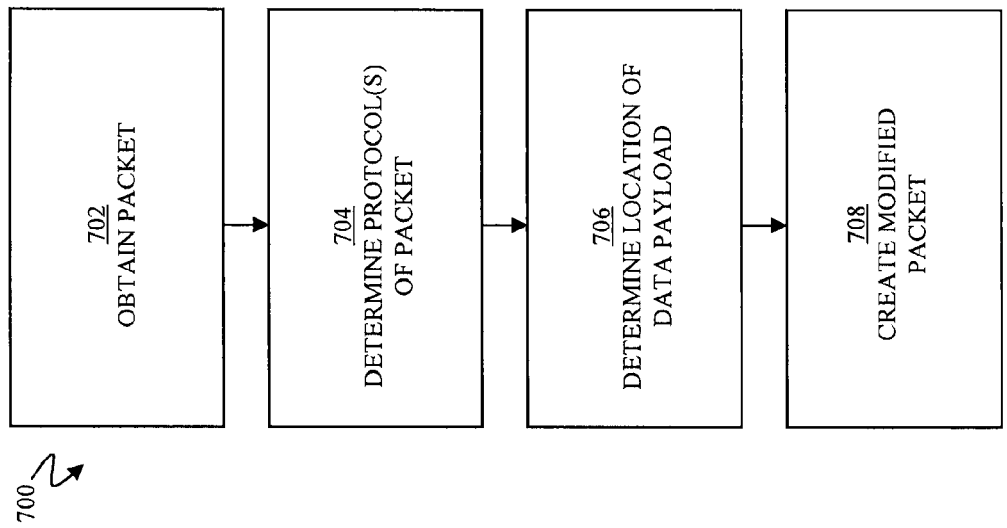
Figure 6:
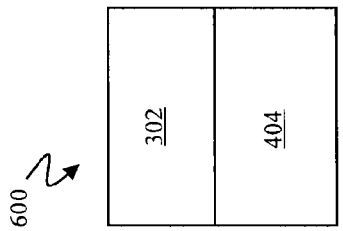
Figure 5:
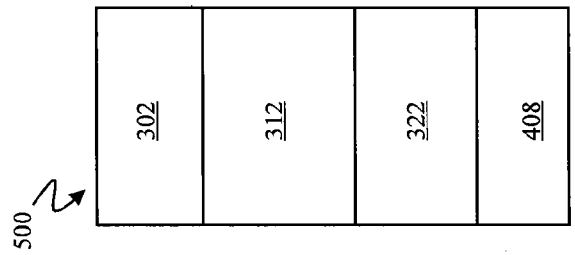
Figure 17:
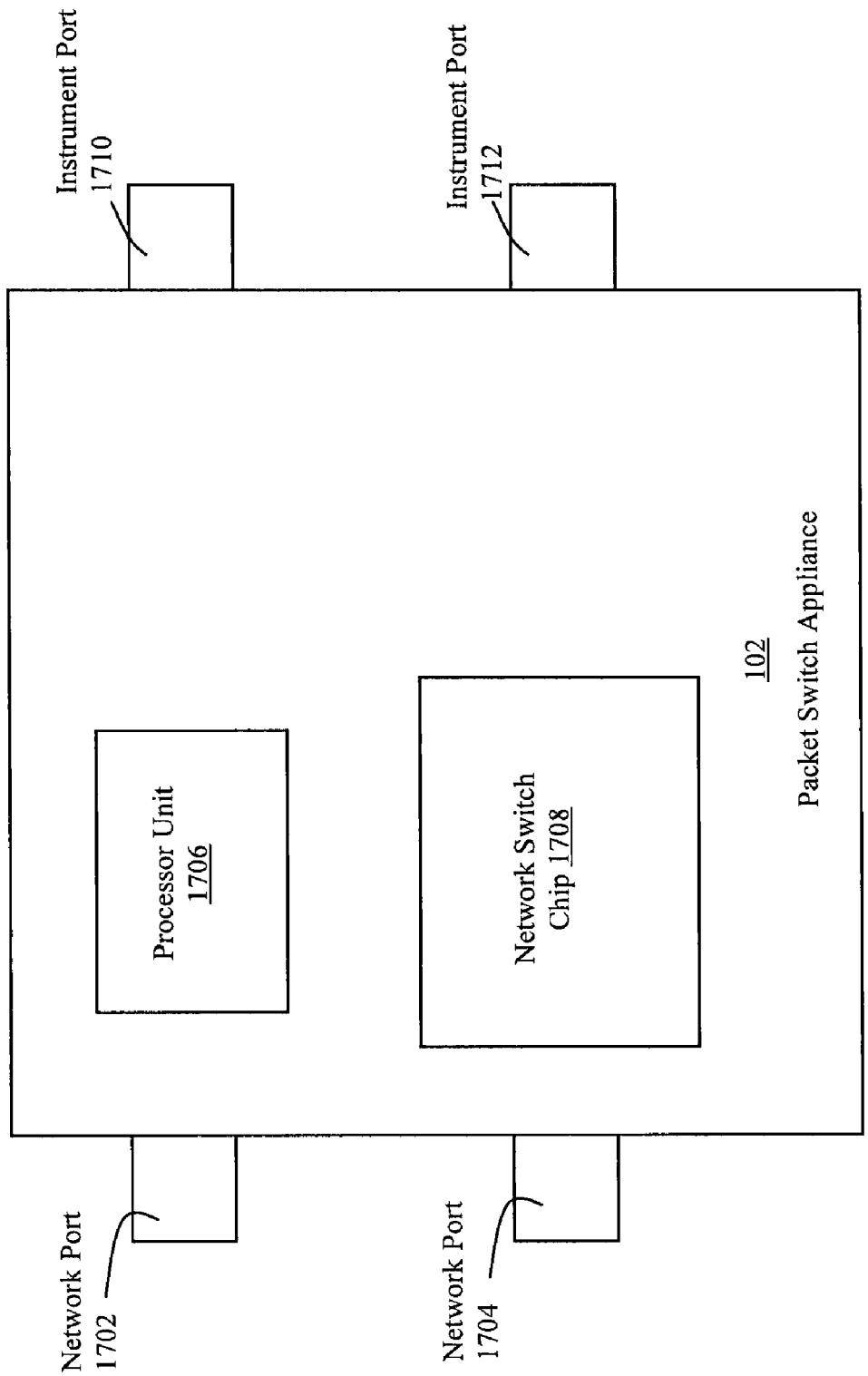
Figure 18:
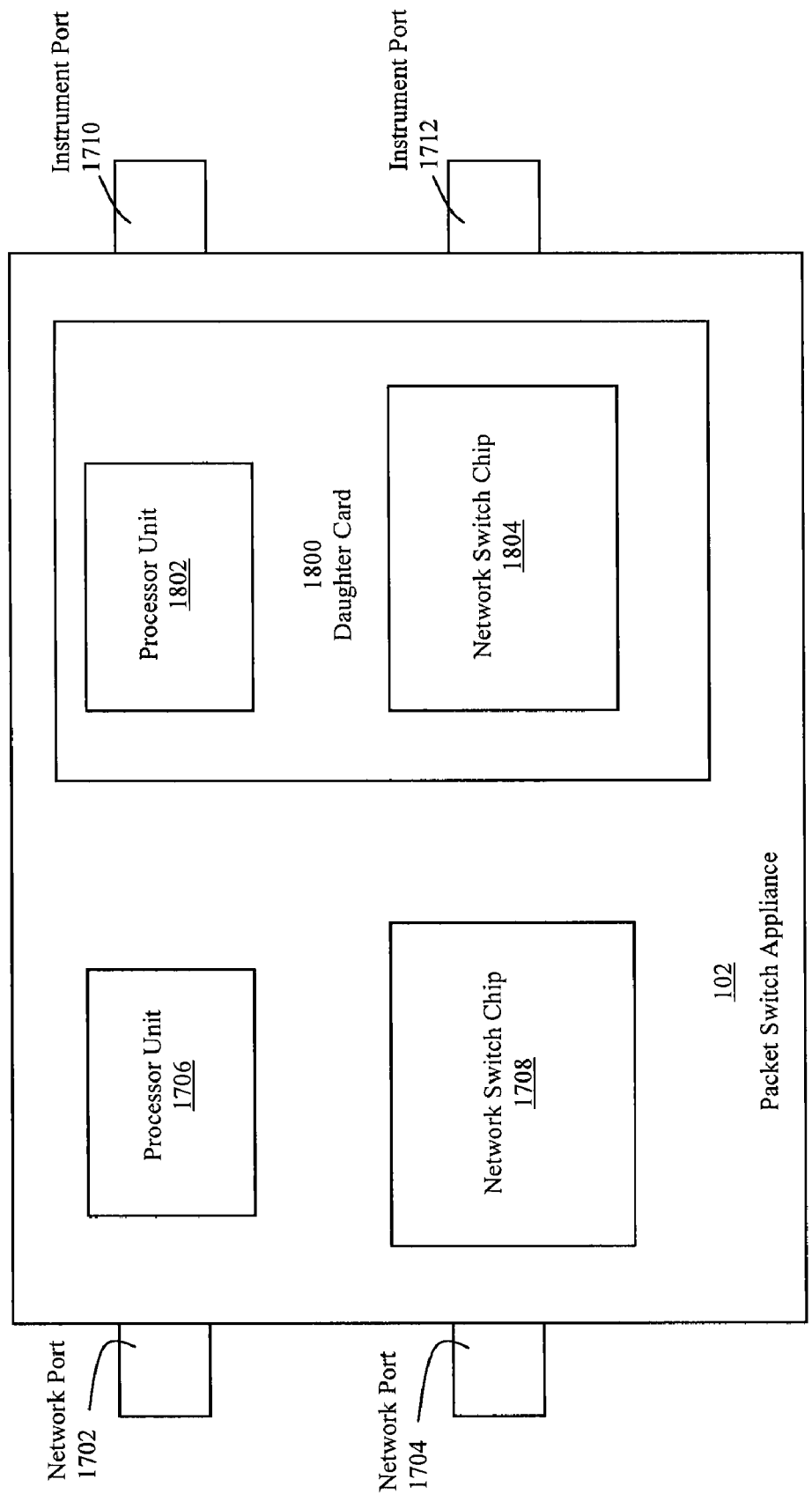

The present application can be best understood by reference to the following description taken in conjunction with the accompanying drawing figures, in which like parts my be referred to by the like numerals:

FIG. 1 illustrates an exemplary computer network;
FIG. 2 illustrates an Ethernet packet;
FIG. 3 illustrates a network packet having layers 2-4;
FIG. 4 illustrates positions of potential fixed offsets for conventional packet slicing;
FIG. 5 illustrates the sliced packet resulting from a fixed offset that is too large;
FIG. 6 illustrates the sliced packet resulting from a fixed offset that is too small;
FIG. 7 illustrates an exemplary process of intelligent packet slicing;
FIG. 8 illustrates a layout of an IP packet header according to the IP specification;
FIG. 9 illustrates a modified packet;
FIG. 10 illustrates a second modified packet;
FIG. 11 illustrates a third modified packet;
FIG. 12 illustrates a fourth modified packet;
FIG. 13 illustrates an exemplary SCTP packet;
FIG. 14 illustrates a modified SCTP packet;
FIG. 15 illustrates a second modified SCTP packet;
FIG. 16 illustrates a modified packet created by masking out the data payload;
FIG. 17 illustrates an embodiment of a packet switch appliance; and
FIG. 18 illustrates an embodiment of a packet switch appliance with a daughter card component.

DETAILED DESCRIPTION

The following description sets forth numerous specific configurations, parameters, and the like. It should be recognized, however, that such description is not intended as a limitation on the scope of the present invention but is instead provided as a description of exemplary embodiments.

With reference to FIG. 1, a packet switch appliance 102 is integrated with packet network 100. Internet 104 is connected via routers 106a and 106b and firewalls 108a and 108b to switches 110a and 110b. Switch 110a is also connected to servers 112a and 112b and to IP phones 114a, 114b, and 114c. Switch 110b is also connected to server 112c-e. The packet switch appliance 102 is connected to various point of the network via network taps and tap ports on the packet switch device. Packet switch appliance 102 is also connected to a variety of network instruments 118, 120, and 122 for monitoring network-wide packet traffic. These network instruments include but are not limited to: packet sniffers, intrusion detection system, and forensic recorder. In alternate embodiments, a packet switch appliance may include fewer components or more components, than those depicted.

As depicted in FIG. 1, because packet switch appliance 102 is connected to every device in the packet network, the packet switch appliance has a global network footprint and may potentially access all data packets transmitted across the network. Consequently, through its various network ports, packet switch appliance 102 can potentially access packets from anywhere throughout the network.

As discussed earlier, when problems occur with network 100, the information contained within packet headers can be useful in diagnosing the problems. Storage of a large number of packets may be required to diagnose the problem fully. Additionally, because of the global footprint of the network, packets may be transmitted from locations all over the world. The retransmission and storage of the packets will potentially burden the network and storage device. Therefore, slicing the packets to remove portions can ease the burdens caused by retransmission and storage. Packets can also be sliced to limit the visibility of the contents of the packets, such as sensitive or confidential information contained in the data payload of packets.

The Open Systems Interconnections Reference Model (OSI Model) is an abstract description for layered communications and network protocol design. The OSI Model defines layers 2, 3, and 4 of a packet as the data link layer, network layer, and transport layer, respectively. However, these layers all have similar structures; all three have headers and data payloads and in the case of Ethernet frames a checksum is also contained in the final 4 bytes of the packet. For ease of discussion, the term packet is used to refer to all three of these structures. The term packet is not meant to be a limitation on the structure of a data unit or on the layer where the data unit exists. Also, it should be recognized that a packet can have more than three layers.

The term packet field refers to fields present in the packet header and, if present, a checksum field at the end of the packet. For example, referring to FIG. 2, Ethernet packet 200 conforms to the IEEE Ethernet 802.3 standard and has three components: header 202, data payload 204, and packet checksum 206. Packet fields of packet 200 include: destination address 208, source address 210, length/type 212, and packet checksum 206.

Additionally, packets utilizing different protocols can be layered within other packets. For example, referring to FIG. 3, Ethernet packet 300 has header 302, data payload 304 and checksum field 306. Layered within Ethernet packet data payload 304 is an Internet Protocol (IP) packet that includes packet header 312 and data payload 314. Layered within IP packet data payload 314 is a Transmission Control Protocol (TCP) packet that includes packet header 322 and data payload 324. The TCP, IP, and Ethernet packets are associated with layers 4, 3, and 2, respectively, of the OSI Model. Packet fields of packet 300 include fields within any header 302, 312, or 322 and packet checksum 306.

Referring to FIG. 4, conventional packet slicing processes have predetermined fixed offsets 400 or 402 as the positions for slicing the packet. This process is satisfactory when packet headers are a constant size and the offset is carefully chosen to slice off only the irrelevant data payload portion of the packet. However, in a typical network, packet headers can vary in size from one packet to the next. This is due to different protocols, different options available in a single protocol, and the possibility of packets layered within data payloads. Therefore, setting a large fixed offset for slicing packet 300 at position 400 creates packet 500 of FIG. 5. Packet 500 retains relevant headers 302, 312, and 322 but also retains irrelevant portion 408, which is part of data payload 324. On the other hand, setting the fixed offset too small, at position 402, creates packet 600 of FIG. 6. Packet 600 contains no irrelevant portions and retains header 302 and portion 404 of header 312, but packet 600 is missing relevant portion 406, which is part of header 312 and all of header 322.

FIG. 7 depicts an exemplary process 700 for intelligently slicing packets. Initially, in step 702, the packet is obtained. For example, the earlier discussed Ethernet packet 300 of FIG. 3 can be obtained from a port of packet switch appliance 102 of FIG. 1.

In step 704, one or more protocols of the obtained packet are determined. Various processes can be used for determining the one or more protocols of a packet. For example, in some networks, only one known protocol might be used. Therefore, in one exemplary embodiment, the protocol is known by default.

However, networks more commonly utilize mixed protocols. Therefore, determining the protocol of a packet by inspection is necessary. With reference to the Internet Protocol (IP), the format of IP packet headers is set forth in RFC791. According to the IP specification, layout 800 in FIG. 8 is the format of an IP packet header. The size of header can be 20-60 bytes long, depending if optional fields 802 are present. Among other information, the header contains information fields such as the length of the header 804 and header checksum 806.

In another exemplary embodiment, the obtained packet is inspected to determine whether the packet is an IP packet. First, based on the IP specification, the packet field that should contain the header length is read. Next, based on the header length, the entire header is read. A checksum for the header is generated according to the IP specification. Finally, the generated checksum is compared to the checksum stored in the header checksum field. If the two checksums match, then the header is likely an IP header and the packet protocol is now known to be an IP packet. If the two checksums do not match, the header is unlikely an IP header, and the packet is checked for a different protocol.

While the process described above is tailored for checking for an IP packet, it should be recognized that similar processes can be used for other protocols. Examples of other protocols include Ethernet, Internetwork Packet Exchange (IPX) Protocol, TCP, Hyper Text Transfer Protocol (HTTP), and User Datagram Protocol (UDP). Processes for determining the protocol used by a packet are well known in the art. For example, Wireshark™ is a software package that is capable of identifying hundreds of different protocols based on inspecting the packet.

As discussed earlier with reference to FIG. 3, often, multiple packets are layered inside of each other. In an exemplary embodiment, to determine the protocols in packet 300, the packet is analyzed as a whole first. If the network uses only Ethernet packets, then the structure of packet 300 and header 302 are already known. However, if more than one standard is used on the network, then the packet header is analyzed, as described above, to look for signatures of various protocols. Once the protocol for the first packet header 302 is determined, data payload portion 304 is analyzed to determine if another packet is layered within data payload portion 304. This is accomplished by analyzing data payload 304 in the same way as packet 300 was analyzed.

Alternatively, top-level packet 300 may contain information in header 302 regarding the type of packet that is layered within data payload portion 304. For example, the IEEE Ethernet standard 802.3 specifies a type field that identifies the protocol of the packet layered in the data payload portion. Similarly, the IP packet header in layout 800 (FIG. 8) specifies that the packet header contain protocol field 808 that identifies the protocol of a layered packet. Many other protocols also specify similar fields. Therefore, the presence and protocol of a layered packet might be determined from reading a packet field in the header of the lower layer packet.

Once the protocol of layered packet is determined, the process is repeated on the layered packet's data payload. In doing so, the protocol for any number of layered packets is determined.

Referring to FIG. 7 again, after the protocol(s) of the packet are determined, the position of the data payload is determined in step 706. Once the protocol of a packet is known, the format of the packet, including the header, is also known. Based on the format of the header, the positions of the different packet fields can be determine. The position of the data payload portion can be determined based on information in the packet fields combined with information from the protocol specification.

Finally, in step 708, a modified packet is created by removing irrelevant portions of the packet while retaining relevant portions. The modified packet may be based on a copy of the originally obtained packet. Alternatively, the modified packet is created by directly modifying the originally obtained packet. The characteristics of the modified packet are configurable by the user specifying which packet portions are relevant and irrelevant.

For example, in one exemplary embodiment, the size of the modified packet is minimized for storage while still retaining all relevant header information. What constitutes relevant information is configurable depending on what the user requests. For example, referring to FIG. 3 again, assume that only the information associated with Ethernet header 302 and checksum 306 are relevant. Modified Ethernet packet 900 in FIG. 9 is created by removing all irrelevant portions of packet 300. Thus, modified packet 900 includes only Ethernet packet header 302 and checksum 306.

If the modified packet is to be transmitted over the network, packet fields may need to be updated to conform to protocol specifications. Potential packet fields to update include, but are not limited to, the total packet length field and the checksum field. By updating the packet fields, modified Ethernet packet 1000 of FIG. 10 results. Modified Ethernet packet 1000 includes: modified packet header 1002, which is packet header 302 with an updated packet length field; data payload portion 1004, which is a 46 byte zero padded section to bring the length of the packet to the minimum of 64 bytes; and updated checksum 1006, which is the correct checksum of the packet generated according to the Ethernet specification. Ethernet packet 1000 is suitable to retransmit over the network.

Alternatively, the user could specify that all headers related to layers 2, 3, and 4 of the OSI Model are relevant and that the modified packet is to be transmitted across the network. In this case, with reference to FIG. 11, modified Ethernet packet 1100 resembles original Ethernet packet 300 with data payload 324 is removed. Modified packet 1100 contains packet header 1102, headers 312 and 322, and checksum 1106. Packet header 1102 can be the same as packet header 302 (FIG. 3) of the original Ethernet packet 300 (FIG. 3). Alternatively, header 1102 can be packet header 302 (FIG. 3) with an updated packet length field. Headers 312 and 322 are the original IP and TCP headers, respectively, of the original Ethernet packet 300 (FIG. 3). Checksum 1106 is the correct checksum of modified packet 1100 generated according to the Ethernet specification. Ethernet packet 1100 is suitable to retransmit over the network.

Optionally, packet fields, such as packet length or header checksums, in headers 312 and 322 could be updated, which would create modified Ethernet packet 1200 of FIG. 12. Modified packet 1200 contains: modified packet headers 1102, which is packet header 302 with an updated packet length field; headers 1212 and 1222, which are the modified version IP and TCP header 312 and 322, respectively; and updated checksum 1206, which is the correct checksum of modified packet 1200 generated according to the Ethernet specification. Ethernet packet 1200 is suitable to retransmit over the network.

In a different configuration, the obtained packet uses the Stream Control Transmission Protocol (SCTP) as specified in RFC 4960 and RFC 3286. Referring to FIG. 13, an exemplary SCTP packet 1300 has a common header 1302 and one or more chunks. Each chunk 1304, 1306, 1308, and 1310 has a header 1314, 1316, 1318, and 1320, respectively, and a data payload 1324, 1326, 1328, and 1330, respectively. The user can configure multiple different parts of the SCTP packet as relevant.

For example, if all header information and data payload portion 1328 are set as relevant, then modified packet 1400 of FIG. 14 results. The common header 1402 and chunk headers 1414, 1416, and 1420 are based on the original headers 1302, 1314, 1316, and 1320, respectively, with updated fields such as the length of the packet or chunk and the header or chunk checksums.

Alternatively, if only the common header 1302 is set as relevant, then modified packet 1500 of FIG. 15 results. Packet 1500 includes only unmodified common header 1302. Also, some chunks of a SCTP packet (such as chucks 1304 and 1306) can be kept, while other chucks (such as chucks 1308 and 1310) are sliced because each chuck represents a unique flow.

It should be recognized that whenever SCTP packet 1300 is modified to create a modified packet, such as modified packet 1400 or 1500, the modified packet includes an updated checksum, which is the correct checksum of the modified packet generated according to the Ethernet specification.

While the discussion of slicing a SCTP so far is in the context of a discrete SCTP packet, the SCTP packet can just as easily be layered within other packets of different protocols. For example, an SCTP packet might be layered inside of an IP packet. The IP packet might further be layer within an Ethernet packet. In this case, the Ethernet header, IP header, etc., are part of the common header.

In another exemplary embodiment, as an alternative to slicing packets, there may be a desire to have the packets retain their original size. This case arises when, for example, analysis of the network requires realistic bandwidth but there is a need for the contents of the packets to remain confidential. This type of confidentiality concern occurs in multiple circumstances such as when the data payload may contain sensitive information like bank records.

Referring to FIG. 16, in an alternative exemplary embodiment, modified packet 1600 is created by masking the data payload 324 (FIG. 3) of packet 300 (FIG. 3) with data payload 1624. By masking irrelevant portions, the packet retains it original size while still protecting the confidentially of contents of the data payload. Masking the data payload can be accomplished by overwriting it with a repeating predetermined pattern such as 0x55 or by overwriting the data payload with random data. While the length of the packet stays the same, modified packet 1600 includes a modified packet checksum 1606, which is created by updating checksum field 306 (FIG. 3) of the original packet with the correct checksum generated according to the Ethernet specification. Additionally, modified TCP header 1622 may be created by updating TCP packet header 322 (FIG. 3) with the correct checksum of the new TCP packet, which includes masked data payload 1624. Alternatively, TCP header 1622 can be the same as TCP packet header 322 (FIG. 3).

Referring back to FIG. 1, in an exemplary embodiment, the process steps described in process 700 (FIG. 7) are implemented in packet switch appliance 102. FIG. 17 depicts an embodiment of packet switch appliance 102 in detail. In the present embodiment, packet switch appliance 102 includes processor unit 1706, network switch chip 1708, network ports 1702 and 1704, and instrument ports 1710 and 1712. The steps of process 700 (FIG. 7) can be performed by processor unit 1706 and/or network switch chip 1708.

Referring to FIG. 18, in an alternative embodiment of packet switch appliance 102 (FIG. 1), daughter card 1800 is installed. Daughter card 1800 includes processor unit 1802 and network switch chip 1804. In the present exemplary embodiment, process 700 (FIG. 7) can be offloaded to daughter card 1800 where processor unit 1802 and/or network switch chip 1804 perform the steps of process 700 (FIG. 7). For additional description of a packet switch appliance with a daughter card, see U.S. patent application Ser. No. 11/796,001, filed Apr. 25, 2007, which is incorporated herein by reference in its entirety for all purposes.

The foregoing descriptions of specific embodiments have been presented for purpose of illustration and description. They are not intended to be exhaustive or to limit the invention to the precise forms disclosed, and it should be understood that many modification and variations are possible in light of the above teaching.

We claim:

1. A method for slicing a series of network packets, the method comprising:
for each packet in the series of packets,
obtaining the packet from the network, the obtained packet having at least a packet header, one or more packet fields, and a first data payload;
determining one or more protocols used by the obtained packet;
based on the determined one or more protocols, parsing the packet header of the obtained packet to determine a position of the first data payload; and
creating a modified packet by removing or masking the first data payload based on the determined position of the first data payload.

2. The method of claim 1, further comprising:
after creating the modified packet, transmitting the modified packet over the network.

3. The method of claim 2, wherein creating a modified packet further comprises:
updating one or more packet fields of the modified packet.

4. The method of claim 3, wherein updating one or more packet fields further comprises:
updating a checksum field.

5. The method of claim 1, wherein creating a modified packet further comprises:
removing or masking a data payload of a second packet layered within the obtained packet while retaining one or more packet headers contained in the obtained packet relating to one or more layers of an Open Systems Interconnections Reference Model.

6. The method of claim 1, wherein the obtained packet further has a second data payload, and wherein creating a modified packet by removing or masking the first data payload based on the determined position of the first data payload further comprises:
removing or masking the second data payload, the first and second data payloads being non-contiguous.

7. A non-transitory computer-readable storage medium encoded with a computer program with computer-executable instructions to:
for each packet in the series of packets,
obtain the packet from the network, the obtained packet having at least a packet header, one or more packet fields, and a first data payload;
determine one or more protocols used by the obtained packet;
based on the determined one or more protocols, parse the packet header of the obtained packet to determine a position of the first data payload; and
create a modified packet by removing or masking the first data payload based on the determined position of the first data payload.

8. The computer-readable storage medium of claim 7, further comprising instructions to:
transmit the modified packet over the network.

9. The computer-readable storage medium of claim 8, wherein the instructions to create a modified packet further comprise instructions to:
update one or more packet fields of modified packet.

10. The computer-readable storage medium of claim 9, wherein the instructions to update one or more packet fields further comprise instructions to:
update a checksum field.

11. The computer-readable storage medium of claim 7, wherein the instructions to create a modified packet further comprise instructions to:
remove or mask a data payload of a second packet layered within the obtained packet while retaining one or more packet headers contained in the obtained packet relating to one or more layers of the Open Systems Interconnections Reference Model.

12. The computer-readable storage medium of claim 7, wherein the obtained packet further has a second data payload and the instructions to create a modified packet further comprise instructions to:
remove or mask the second data payload, the first and second data payloads being non-contiguous.

13. A packet switch appliance configured to be connected to a network, the packet switch appliance comprising:
a processor unit;
a network switch chip;
a plurality of ports; and
a computer-readable storage medium containing computer-executable instructions to:
for each packet in the series of packets,
obtain the packet from the network, the obtained packet having at least a packet header, one or more packet fields, and a first data payload;
determine one or more protocols used by the obtained packet;
based on the determined one or more protocols, parse the packet header of the obtained packet to determine a position of the first data payload; and
create a modified packet by removing or masking the first data payload based on the determined position of the first data payload.

14. The packet switch appliance of claim 13, further comprising:
a daughter board, wherein the daughter board comprises:
a second processor unit; and
a second network switch chip, wherein the second processor unit and/or the second network switch chip execute the computer-executable instructions contained on the computer-readable storage medium.

15. The packet switch appliance of claim 13, wherein the instructions to create a modified packet further comprise instructions to:

remove or mask a data payload of a second packet layered within the obtained packet while retaining one or more packet headers contained in the obtained packet relating to one or more layers of an Open Systems Interconnections Reference Model.

16. The packet switch appliance of claim 13, wherein the obtained packet further has a second data payload and the instructions to create a modified packet further comprise instructions to:

remove or mask the second data payload, the first and second data payloads being non-contiguous.

17. The packet switch appliance of claim 13, wherein creating a modified packet further comprises:

removing or masking a data payload of a second packet layered within the obtained packet while retaining one or more packet headers contained in the obtained packet relating to one or more layers of the Open Systems Interconnections Reference Model.

18. The packet switch appliance of claim 13, wherein the computer-executable instructions comprise instructions for transmitting the modified packet over the network after the modified packet is created.

19. The packet switch appliance of claim 13, wherein the instructions for creating the modified packet comprises instructions for updating one or more packet fields of the modified packet.

20. The packet switch appliance of claim 13, wherein the computer-executable instructions comprise instructions for updating a checksum field.

* * * * *